April 26, 1955     A. LOFT     2,707,275
TEMPERATURE RESPONSIVE CONTROL DEVICE
Filed Nov. 24, 1951
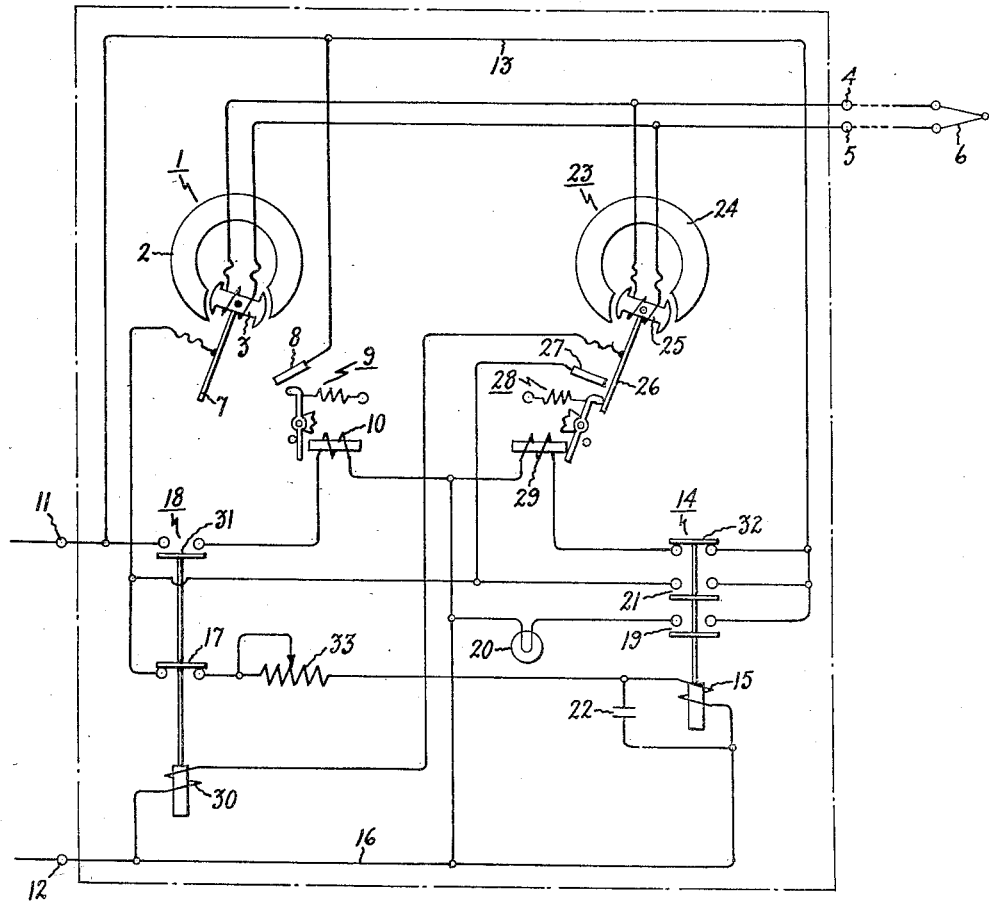
Inventor:
Arne Loft,
by Richard E. Hosley
His Attorney.

United States Patent Office 2,707,275
Patented Apr. 26, 1955

2,707,275

TEMPERATURE RESPONSIVE CONTROL DEVICE

Arne Loft, Schenectady, N. Y., assignor to General Electric Company, a corporation of New York Application November 24, 1951, Serial No. 258,057

5 Claims. (Cl. 340—227)

This invention relates to temperature responsive control devices and more particularly to a flame detector relay circuit suitable for use in connection with thermal power plants such as gas turbines.

In the design of control circuits utilized in conjunction with gas turbines, it is necessary to include a flame detecting arrangement which senses the presence of combustion in the combustion chambers and performs a control function, for example, shutting down the turbine in the event that combustion does not take place or discontinues. The devices usually employed for sensing the presence of the flame, for example, thermal couples or thermal piles, have a very low energy output and it is therefore necessary to provide a device to amplify the signal from the temperature sensing element to a value which can be utilized in the balance of the control circuit. In the past, 400-cycle magnetic amplifiers have been utilized for this purpose, however, these devices have required excessive attention and maintenance because of drift and other troubles inherent in high-gain amplifiers.

An object of this invention is therefore to provide an improved temperature responsive control device characterized by its simplicity, reliability, and freedom from the necessity of excessive attention or maintenance.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with the preferred embodiment of this invention, a first instrument type relay is provided having its movable coil adapted to be connected for energization from a temperature sensing device, such as a thermal pile. This relay has a contact which is adapted to be closed responsive to movement of the coil indicating a predetermined upper temperature or temperature differential, and magnet means are provided for holding the contact closed with a solenoid reset device being provided for releasing the contact from the magnet. These sensitive relays are commercially available and do not form a part of this invention, other than in combination with other elements to be hereinafter more fully described. An indicating circuit is provided which, when energized, gives an indication of the predetermined upper temperature. This circuit may energize an indicating lamp or provide a signal for other control devices. A first auxiliary relay is provided having a contact arranged in circuit with the indicating circuit for connecting that circuit for energization, and having its operating coil connected in circuit with the contact of the first sensitive relay. In this way, the indicating circuit is energized responsive to the predetermined upper temperature. A second instrument-type relay is provided, also having its movable coil adapted to be connected for energization from the temperature sensing device. However, this relay has its contact adapted to be closed responsive to the movable coil indicating a predetermined lower temperature or temperature differential. This relay is also provided with magnet means for holding the contact closed and a solenoid reset device for releasing the contact from the magnet. A second auxiliary relay is provided having a contact arranged in circuit with the coil of the first auxiliary relay for opening the circuit thereof, and having its coil connected in circuit with the contact of the second sensitive relay, so that the indicating circuit is de-energized responsive to the predetermined lower temperature. The second auxiliary relay has a second contact arranged in circuit with the solenoid reset device of the first sensitive relay for energizing this solenoid reset, so that the first sensitive relay contact is released from its magnetic holding device when the second sensitive relay indicates the predetermined lower temperature, and the first auxiliary relay has a second contact arranged in circuit with the solenoid reset device of the second sensitive relay, so that the contact of this relay is released when the first sensitive relay indicates the predetermined upper temperature.

The single figure of the drawing schematically illustrates the circuit of the improved temperature-responsive control device of this invention.

Referring now to the drawing, there is shown a first instrument-type sensitive relay 1 having a permanent magnet core 2 and a movable coil 3. The coil 3 is connected to external terminals 4 and 5 which are adapted to be connected to a suitable temperature sensing device, such as a thermal pile shown schematically at 6. A suitable thermal pile for this application is more fully shown and described in my Patent 2,538,642 issued January 16, 1951 and assigned to the assignee of the present application. The relay 1 has a movable contact element 7 and a stationary contact element 8 in the form of a permanent magnet. It will thus be seen that when the energization of the coil 3 causes the movable contact element 7 to move and contact the stationary contact 8, it will be held closed by action of the permanent magnet. In order to release the contact 7 from the permanent magnet 8, a solenoid reset device 9 is provided having an operating coil 10. A pair of external terminals 11 and 12 are provided adapted to be connected to an external source of direct current control power, and positive bus 13 is connected to the positive external terminal 11, with the stationary contacting magnet 8 of the sensitive relay 1 being connected thereto.

A first auxiliary relay 14 is provided having its operating coil 15 connected to negative bus 16, which in turn is connected to the negative external terminal 12, and to the movable contact 7 of the pickup relay 1 through normally-closed contact 17 of the second auxiliary relay 18. The auxiliary relay 14 is provided with a normally open contact 19 which connects the indicating lamp 20 in circuit between the positive bus 13 and the negative bus 16, and a second normally open contact 21 which, when closed, seals in the operating coil 15 across the contacts 7 and 8 of the pickup relay 1. A capacitor 22 is connected across the operating coil 15 to provide slow dropout, as will be hereinafter described. It will now be seen that when the temperature sensing device 6 provides sufficient energization to the movable coil 3 of the pickup relay 1 to move the movable contact 7 to the stationary contact 8, operating coil 15 of relay 14 will be energized through normally closed contact 17 of auxiliary relay 18, thus causing relay 14 to pick up, closing normally open contacts 19 to illuminate indicating lamp 20, and also closing normally open contacts 21 to seal the operating coil 15 in around the contacts 7 and 8 of the pickup relay 1.

A second instrument-type relay 23 is provided having a permanent magnet core 24 and a movable coil 25, which is also connected for energization from the temperature sensing device 6 across the terminals 4 and 5. Dropout relay 23 has a movable contact 26 and a stationary contact 27, which includes a permanent magnet so that the contact 26 when engaging the stationary contact 27 is held in the closed position. A solenoid reset device 28 is also provided having an operating coil 29. Inspection of the drawing will show that the operating coil 30 of the second auxiliary relay 18 is connected between the negative bus 16 and the movable contact 26 of the dropout relay 23, and that the stationary contact 27 is connected to the normally-open contacts 21 of relay 14. Thus, it will be seen that after pickup relay 1 has operated to close contacts 7 and 8 responsive to a signal from the temperature sensing device 6 indicating a sufficiently high temperature, thus causing relay 14 to pick up closing contacts 21, the predetermined lower temperature sensed by the temperature sensing device 6 will cause the dropout relay 23 to close the contacts 26 and 27, thus energizing the coil 30 to open the normally-closed contacts 17, de-energizing the coil 15 of relay 14 to extinguish the indicating lamp 20.

The second auxiliary relay 18 is also provided with a normally open contact 31 which connects the operating coil 10 of the solenoid reset device 9 of the pickup relay 1 between the positive bus 13 and the negative bus 16. The first auxiliary relay 14 is also provided with a normally closed contact 32 connecting the operating coil 29 of solenoid reset device 28 of the dropout relay 23 in circuit between the positive bus and the negative bus 16. Variable resistor 33 provides for adjustment of the pickup and dropout characteristics of the first auxiliary relay 14.

In operation, the pickup relay 1 is calibrated so that the contacts 7 and 8 will be closed at a predetermined higher temperature responsive to a signal provided by the temperature sensing device 6, for example, when flame is present in the combustion chambers of the gas turbine. The dropout magnetic relay 23 is calibrated so that the contacts 26 and 27 will be closed at a lower predetermined temperature, for example, when no flame is sensed by the temperature sensing device 6. Assuming that combustion has taken place in the combustion chambers of the gas turbine, the temperature sensing device 6 will provide a sufficient signal to the moving coil 3 of the pickup relay 1 to close the contacts 7 and 8. Prior to combustion taking place, the relay 14 will not be picked up and, therefore, normally closed contacts 32 energize the operating coil 29 of solenoid reset device 28 to move the movable contact 26 of dropout relay 23 away from the magnet 27. When flame occurs, the movable contact 7 of the pickup relay 1 moves to the stationary contact 8, where it is held by the magnet, thereby energizing operating coil 15 so that relay 14 picks up, sealing itself in through contacts 21. When relay 14 picks up, contacts 19 close, causing indicating lamp 20 to be illuminated. It will be readily understood that in place of the indicating lamp 20, any other control device or circuit may be substituted to respond to the indicating signal. The presence of flame in the combustion chambers as sensed by the temperature sensing device 6, in addition to causing the movable contacts 7 of the pickup relay 1 to contact the stationary contact 8, has caused the movable contact 26 of the dropout relay 23 to move to the right as shown in the drawing, away from the stationary contact 27.

Assuming that the flame in the combustion chamber goes out, the movable contact 26 of the dropout relay 23 will move to the left, contacting the stationary contact 27, where it is held in place by a permanent magnet. Since the relay 14 is sealed in through contact 21, closing of the contacts 26 and 27 will energize operating coil 30 of relay 18, thus opening contacts 17 to de-energize operating coil 15 of relay 14. However, relay 14 does not drop out immediately by virtue of the time delay action provided by the capacitor 22. The picking up of the relay 18 energizes the operating coil 10 of the solenoid reset device 9 to release the movable contact 7 from the permanent magnet 8 and it then moves to the position shown in the drawing. When the relay 14 drops out, after the time delay provided by the capacitor 22, contact 32 will be closed energizing operating coil 29 of solenoid reset 28 to release the movable contact 26 of dropout relay 23 from the permanent magnet 27. This in turn de-energizes the operating coil of relay 18 causing it to drop out to restore the system to its original condition. The dropping out of the relay 14 of course opens the contacts 19 to extinguish the indicating lamp 20.

It will now be readily apparent that this invention provides a simple temperature responsive control device which effectively amplifies a signal provided by a low energy temperture sensing element to a value suitable for use in control devices. This device is constructed of simple and commercially available elements and requires a minimum of attention and maintenance. It will be readily understood that this device is operable with a temperature sensing element which provides either a positive sensing of a definite temperature or a sensing of a temperature differential and therefore references herein to predetermined temperature refer to either a definite temperature or a temperature differential.

While I have shown and described a particular embodiment of this invention, further modifications and improvements may occur to those skilled in the art. I desire it to be understood, therefore, that this invention is not limited to the form shown and I intend in the appended claims to cover all modifications which do not depart from the spirit and scope of this invention.

What I claim as new and desire to secure by Letters Patent of the United States is:

1. A temperature responsive control device comprising a first relay having its coil adapted to be connected for energization from a temperature sensing device and being operable at a predetermined upper temperature, means for holding said first relay in its operated position, an indicating circuit for providing when energized an indication of said predetermined upper temperature, a first auxiliary relay having a coil and a contact arranged to connect said indicating circuit for energization, said first relay having a contact arranged to connect said first auxiliary relay coil for energization whereby said indicating circuit is energized responsive to said predetermined upper temperature, a second relay having its coil adapted to be connected for energization from said temperature sensing device and being operable responsive to a predetermined lower temperature, a second auxiliary relay having a coil and a contact arranged to open said indicating circuit, said second relay having a contact arranged to connect said second auxiliary relay coil for energization whereby said indicating circuit is de-energized responsive to said predetermined lower temperature, means for releasing said holding means, said second auxiliary relay having another contact arranged to connect said releasing means for energization, means for holding said second relay in its operated position, and means for releasing said last-named holding means, said first auxiliary relay having another contact arranged to open the circuit of said last-named releasing means.

2. A temperature responsive control device comprising a first relay having its coil adapted to be connected for energization from a temperature sensing device and being operable at a predetermined upper temperature, means for holding said first relay in its operated position, an indicating circuit for providing when energized an indication of said predetermined upper temperature, a first auxiliary relay having a coil and a contact arranged to connect said indicating circuit for energization, said first relay having a contact arranged to connect said first auxiliary relay coil for energization whereby said indicating circuit is energized responsive to said predetermined upper temperature, a second relay having its coil adapted to be connected for energization from said temperature sensing device and being operable responsive to a predetermined lower temperature, a second auxiliary relay having a coil and a contact arranged to open said indicating circuit, said second relay having a contact arranged to connect said second auxiliary relay coil for energization whereby said indicating circuit is de-energized responsive to said predetermined lower temperature, means for releasing said holding means, said second auxiliary relay having another contact arranged to connect said releasing means for energization, means for holding said second relay in its operated position, and means for releasing said last-named holding means, said first auxiliary relay having another contact arranged to open the circuit of said last-named releasing means, said first auxiliary relay having a third contact arranged to seal said first auxiliary relay coil in across said first relay contact.

3. A temperature responsive control device comprising a first instrument-type relay having a movable coil adapted to be connected for energization from a temperature sensing device and having a contact adapted to be closed responsive to said coil indicating a predetermined upper temperature, magnet means for holding said contact closed, a solenoid reset device for releasing said contact from said magnet means, an indicating circuit for providing when energized an indication of said predetermined upper temperature, a first auxiliary relay having a coil and a contact arranged in circuit with said indicating circuit for connecting said circuit for energization, said first relay contact being arranged in circuit with said first auxiliary relay coil for connecting said auxiliary relay coil for energization whereby said indicating circuit is energized responsive to said predetermined upper temperature, a second instrument-type relay having a movable coil adapted to be connected for energization from said temperature sensing device and having a contact adapted to be closed responsive to said coil indicating a predetermined lower temperature, a second magnet means for holding said last-named contact closed, a second solenoid reset device for releasing said last-named contact from said second magnet means, a second auxiliary relay having a coil and a contact arranged in circuit with said first auxiliary relay coil for opening the circuit of said coil, said contact of said second relay being arranged in circuit with said second auxiliary relay coil for connecting said last-named coil for energization whereby said indicating circuit is de-energized responsive to said predetermined lower temperature, said second auxiliary relay having a second contact arranged in circuit with said first solenoid reset device for connecting said last-named device for energization whereby said first relay contact is released when said second relay indicates said predetermined lower temperature, said first auxiliary relay having a second contact arranged in circuit with said second solenoid reset device for opening the circuit of said last-named solenoid whereby said second relay contact is released when said first relay indicates said predetermined upper temperature.

4. A condition responsive control device comprising first and second magnetic stationary electric contacts, a first condition response means having a first contact movable in response to a predetermined high condition into engagement with said first stationary contact and magnetically secured in such engagement, a second condition responsive means having a contact movable in response to a predetermined low condition into engagement with said second stationary contact and magnetically secured in such engagement, solenoid release means for each of said movable contacts for disengaging when energized each of said movable contacts from its stationary contact, an electric indicating device, a first relay provided with a first operating coil and with normally open contacts connected in circuit with said indicating device, connections connecting said first operating coil in circuit with said first movable and stationary contacts for energization of said first operating coil and closure of said normally open contacts to energize said indicating device when said movable and stationary contacts are engaged in response to said high condition, a second relay provided with a second operating coil and with normally closed contacts in circuit with said first operating coil, connections connecting said second operating coil in circuit with said second movable and stationary contacts for energization of said coil and separation of said normally closed contacts to deenergize said first relay coil in response to said low condition, normally open contacts on said second relay closed upon energization of its coil and connected thereby to energize said solenoid release means for said first movable contact to disengage it from its stationary contact, normally closed contacts on said first relay connected in circuit to energize said solenoid release means for said second movable contact when said second operating coil is deenergized thereby to disengage said second movable contact, and a pair of normally open contacts on said first relay connected in series circuit with said second movable and stationary contacts and connected in a shunt circuit around said first movable and stationary contacts for sealing in said first operating coil independently of said second movable and stationary contacts.

5. A condition responsive control device comprising first and second permanent magnet stationary electric contacts, a first condition response means having a first contact movable in response to a predetermined high condition into engagement with said first stationary contact and magnetically secured in such engagement, a second condition responsive means having a contact movable in response to a predetermined low condition into engagement with said second stationary contact and magnetically secured in such engagement, solenoid release means for each of said movable contacts for disengaging when energized each of said movable contacts from its stationary contact, an electric indicating device, a first relay provided with a first operating coil and with normally open contacts connected in circuit with said indicating device, connections connecting said first operating coil in circuit with said first movable and stationary contacts for energization of said first operating coil and closure of said normally open contacts to energize said indicating device when said movable and stationary contacts are engaged in response to said high condition, a second relay provided with a second operating coil and with normally closed contacts in circuit with said first operating coil, connections connecting said second operating coil in circuit with said second movable and stationary contacts for energization of said coil and separation of said normally closed contacts to deenergize said first relay coil in response to said low condition, means for delaying the deenergization of said first operating coil for a time interval after separation of said normally closed contacts, normally open contacts on said second relay closed upon energization of its coil and connected thereby to energize said solenoid release means for said first movable contact to disengage it from its stationary contact, normally closed contacts on said first relay connected in circuit to energize said solenoid release means for said second movable contact when said second operating coil is deenergized thereby to disengage said second movable contact, and a second pair of normally open contacts in said first relay connected in circuit with said second movable and stationary contacts and connected in a shunt circuit around said first movable and stationary contacts for sealing said first operating coil independently of said second movable and stationary contacts.

References Cited in the file of this patent

UNITED STATES PATENTS

| Number | Name | Date |
| --- | --- | --- |
| 1,128,081 | Vogel | Feb. 9, 1915 |
| 2,189,846 | Valtat | Feb. 13, 1940 |
| 2,444,398 | De Mott | June 29, 1948 |
| 2,574,419 | Ruffle | Nov. 6, 1951 |
| 2,576,371 | Thompson | Nov. 27, 1951 |
| 2,629,863 | Stern | Feb. 24, 1953 |